United States Patent
Ellis, III

(10) Patent No.: US 8,296,262 B1
(45) Date of Patent: Oct. 23, 2012

(54) SYSTEMS AND METHODS FOR REAL-TIME ONLINE MONITORING OF COMPUTING DEVICES

(75) Inventor: Lake E. Ellis, III, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 345 days.

(21) Appl. No.: 12/434,972

(22) Filed: May 4, 2009

(51) Int. Cl.
*G06F 17/30* (2006.01)

(52) U.S. Cl. .......................................... 707/634

(58) Field of Classification Search ............... 707/2, 102, 707/634; 713/186
See application file for complete search history.

(56) References Cited

U.S. PATENT DOCUMENTS

| | | | |
|---|---|---|---|
| 6,549,932 B1 | 4/2003 | McNally et al. | |
| 6,606,304 B1 | 8/2003 | Grinter et al. | |
| 7,890,569 B1* | 2/2011 | Stahl | 709/202 |
| 2003/0078942 A1 | 4/2003 | Childress et al. | |
| 2005/0021984 A1* | 1/2005 | Hollander | 713/186 |
| 2005/0034134 A1 | 2/2005 | Lieblich et al. | |
| 2005/0256805 A1* | 11/2005 | Satkunanathan et al. | 705/59 |
| 2006/0224361 A1 | 10/2006 | McIntyre et al. | |

OTHER PUBLICATIONS

Finke, Jon: "Monitoring Usage of Workstations with a Relational Database", Rensselear Polytechnic Institute, Sep. 19-23, 1994, pp. 147-156.

* cited by examiner

*Primary Examiner* — Etienne LeRoux
(74) *Attorney, Agent, or Firm* — Brooks, Cameron & Huebsch, PLLC

(57) ABSTRACT

Computing devices, such as workstations, associated with an institution system may each run a real-time online (RTO) software application. Each RTO application may comprise a software object that executes on the computing device to recognize events pertaining to the computing device, such as startup, shutdown, user logon, and user logoff. Upon occurrence of one of the events, data pertaining to the event is forwarded to the institution system, where it may be processed and stored in an RTO repository for future querying. The institution system may generate a plurality of reports based on an analysis of event data it has received from each computing device.

21 Claims, 5 Drawing Sheets

SYSTEMS AND METHODS FOR REAL-TIME ONLINE MONITORING OF COMPUTING DEVICES

BACKGROUND

Within business organizations, educational institutions, and other large entities, individual computers are increasingly connected to each other by means of a network. As the number of computers on a network increases, the complex task of managing the networked computers quickly overwhelms information technology (IT) departments. Currently, real-time analysis is nearly impossible for these systems. A network administrator typically must wait until data is compiled before making changes to individual computers on the network.

Current methods of monitoring individual computers, such as workstations, for a large enterprise are cumbersome and do not collect data quickly enough to be of use in real-time. Current methods rely on remote scans and polling each individual workstation for information, which causes large network overhead and information latency, in some cases returning information that is only partially accurate and too stale for action.

SUMMARY

Computing devices, such as workstations, associated with an institution system may each run a real-time online (RTO) software application. Each RTO application may comprise a software object that executes on the computing device to recognize events pertaining to the computing device, such as startup, shutdown, user logon, and user logoff. Upon occurrence of one of the events, data pertaining to the event is forwarded to the institution system, where it may be processed and stored in an RTO repository for future querying.

In an implementation, the institution system may comprise a report generator that generates a plurality of reports based on an analysis of event data it has received from each computing device.

In an implementation, the report generator may use the event data in conjunction with information and/or analysis obtained from other systems or data sources to provide various types of systematic computing device usage reports. Such other systems or data sources may include, for example, a human resources (HR) profiler, a network analyzer, a software analyzer, an asset analyzer, and/or an inventory manager.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
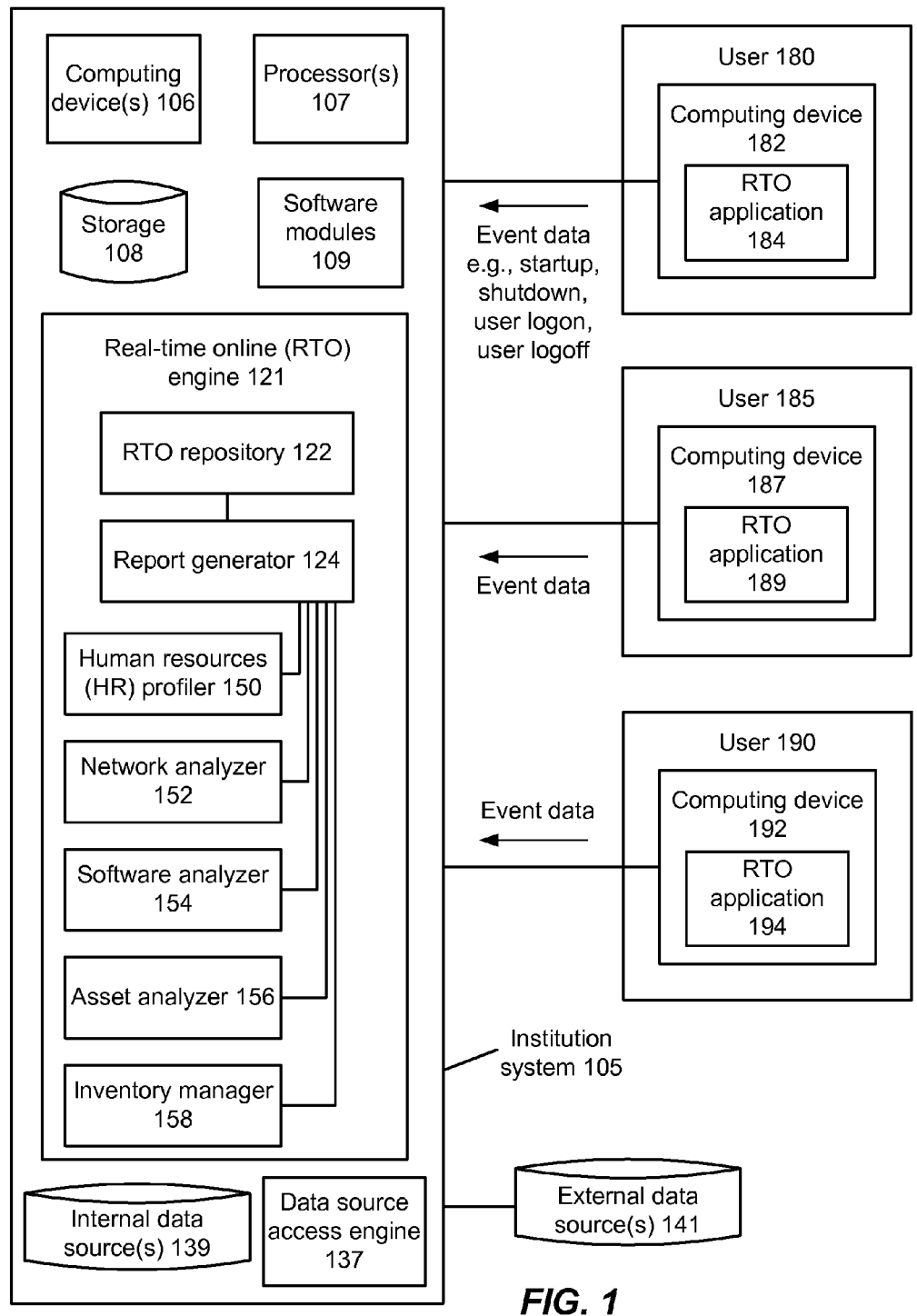
FIG. 1 is a block diagram of an implementation of a system that may be used in conjunction with real-time online monitoring and reporting of computing devices in a network.

FIG. 1 is a block diagram of an implementation of a system that may be used in conjunction with real-time online monitoring and reporting of computing devices in a network. An institution system 105 may be affiliated with an institution which may be any type of entity or enterprise having a plurality of computer systems (may be referred to herein as computing devices or workstations, for example) that are interconnected through one or more networks. A workstation is a microcomputer that is intended primarily to be used by one person at a time and is commonly connected to a local area network (LAN) and runs multi-user operating systems. The term workstation may also refer to a mainframe computer terminal or a personal computer (PC) connected to a network.

In FIG. 1, three computing devices 182, 187, 189 are shown connected to the institution system 105. Each computing device 182, 187, 189 is associated with a user 180, 185, 190, respectively. Although only three users 180, 185, 190 and three computing devices 182, 187, 189 are shown in FIG. 1, any number of users and any number of computing devices are contemplated and may be in communication with the institution system 105.

In an implementation, each user 180, 185, 190 may be an individual or other entity who accesses and/or uses a computing device. Each computing device 182, 187, 192 may be any type of workstation, PC, laptop or notebook computer, handheld computing device such as a personal digital assistant (PDA), a smartphone, or a mobile phone, for example. An example computing device is described with respect to FIG. 5.

Each computing device 182, 187, 192 and the institution system 105 may be connected over a communications network. Each computing device 182, 187, 192 may be continually connected to the institution system 105 or occasionally connected to the institution system 105. Each user 180, 185, 190 and each computing device 182, 187, 192 may communicate with the institution system 105 by way of a communications network such as an intranet, the Internet, a LAN, a wide area network (WAN), a wireless fidelity (WiFi) network, a public switched telephone network (PSTN), a cellular network, a voice over Internet protocol (VoIP) network, and the like.

A LAN is a network that usually spans a relatively short distance. A plurality of LANs is contemplated and may be coupled to one another through a WAN. A WAN is a network that may span a relatively large geographical area, and may connect computing devices and/or LANs which are very far apart. In such a manner, for example, the computing devices 182, 187, 192 may be connected to each other. Any of a variety of network topologies (i.e., the geometric arrangement of devices on the network), protocols (i.e., the rules and encoding specifications for sending data, and whether the network uses a peer-to-peer or client/server architecture), and media (e.g., twisted-pair wire, coaxial cables, fiber optic cables, radio waves) may be used.

Each computing device 182, 187, 192 may run a real-time online (RTO) software application, shown as RTO applications 184, 189, 194, respectively. Each RTO application may comprise a software object that executes on an associated computing device to recognize events pertaining to the computing device, such as startup, shutdown, user logon, and user logoff. Upon occurrence of one of the events, data pertaining to the event is forwarded to the institution system 105, where it may be processed and stored in an RTO repository 122 for future querying. The RTO repository 122 may be any type of storage or memory device, and the data may be stored, e.g., as an entry in a database record corresponding to the computing device, the user, the event, the date, the time, the processes executing on the computing device and the computing device resources, etc. Thus, real-time data on computing device online/offline, and user logon/logoff statuses may be obtained and data collection latency may be eliminated with respect to remotely determining computing device online/offline and user logon/logoff statuses.

The institution system 105 may generate a plurality of reports based on the analysis of the event data it has received from each computing device 182, 187, 192. The institution system 105 may comprise an RTO engine 121 that comprises the RTO repository 122 and a report generator 124. The report generator 124 may retrieve and process event data from RTO repository 122 and generate a variety of reports using the event data.

The institution system 105 may thus accurately determine real-time and historical statistics on workstation online/offline and user logon/logoff statuses using the appropriate associated event data from one or more of the computing devices 182, 187, 192 connected to the institution system 105. Although event data is described with respect to startup, shutdown, user logon, and user logoff, one skilled in the art will understand that any data regarding the applications, resources, or events of a computing device, such as the computing device 182, 187, or 192 may be used.

The RTO engine 121 may collect, track, and respond to event data provided by the computing devices 182, 187, 192 alone or in conjunction with data provided or obtained from one or more internal data source(s) 139 and/or external data source(s) 141, e.g., via a data source access engine 137.

In an implementation, the RTO engine 121 may obtain data from internal data source(s) 139 and/or external data source(s) 141 using the data source access engine 137. The RTO engine 121 has access to data, files, and documents pertaining to the users 180, 185, 190 and their computing devices 182, 187, 192, as well as any other data, files, and documents that are currently stored by the institution system 105 (stored in internal data source(s) 139, the RTO repository 122, and storage 108, for example) as well as external data, files, and documents (stored in external data source(s) 141, for example). Such data, files, and documents stored in the internal data source(s) 139 and/or the external data source(s) 141 may be useful in determining behaviors of the users 180, 185, 190 with respect to their computing devices 182, 187, 192 and generating reports directed to the users 180, 185, 190 and/or the computing devices 182, 187, 192, as described further herein.

Internal data source(s) 139 may contain data, metadata, email, files, and/or documents that the institution system 105 maintains pertaining to the user 180, 185, 190, such as personal data such as name, physical address, email address, etc., as well as event and asset (e.g., equipment, hardware, software, etc.) information. The external data sources 141 may be data sources that are unaffiliated with the institution system 105 and may include public databases and private databases and other information that is publicly or otherwise accessible (e.g., using the appropriate credentials). The retrieved data may be stored centrally, perhaps in storage 108. Information may also be provided to the institution system 105 from the users 180, 185, 190.

Real-time capability provides a foundation for a number of uses for the event data, such as software distribution and licensing, workforce optimization, fraud detection, enterprise asset management, etc., for example. In an implementation, the report generator 124 may use the event data in conjunction with information and/or analysis obtained from other systems or data sources to provide various types of systematic computing device usage reports. Such other systems or data sources may include, for example, a human resources (HR) profiler 150, a network analyzer 152, a software analyzer 154, an asset analyzer 156, and an inventory manager 158.

The HR profiler 150 may monitor, track, and determine user information, such as information pertaining to users that are currently logged on, such as their names, job descriptions, titles, etc. The network analyzer 152 may determine network information, such as which user just logged into which computing device. The software analyzer 154 may analyze applications on the computing devices. The asset analyzer 156 may analyze the assets of the institution system 105, such as determining whether computing devices are being utilized properly or are underutilized and may be redeployed or returned to stock. The inventory manager 158 maintains hardware and software inventory, such as how many computing devices are online and how many are offline.

Using the event data, reports may be generated directed to information such as which computing devices (e.g., workstations) are currently online, which computing devices are currently offline, and which users are currently logged on, for example. The event data may be used for troubleshooting, such as to determine which computing devices have not been rebooted during a particular period of time or the number of times a computing device has been rebooted during a particular period of time.

Asset management may also be provided using the event data. For example, computing devices that have not been on the network (e.g., not started up) in a particular length of time may be tracked (e.g., as lost or stolen equipment). Determining the last time a specific computing device was powered on may assist with asset tracking and total enterprise computing device counts. Additionally, the last logged on user for a specific lost computing device may be determined in order to assist in locating the lost computing device.

Additionally, user logon trending may be provided using data such as the number of computing devices that are logged on during particular times of the day. This data may be used to re-allocate computing devices so they are not under-utilized or over-utilized. User logon behavior may be monitored, such as the status of the user logon at a particular time each day (e.g., the logon status of a user everyday at a particular time). Additionally, the event data may be used to determine which computing devices a user has logged onto. Such a determination may be useful for a security analysis. Using the event data, a primary user for a particular computing device may be determined.

In an implementation, the event data may be used in software license management and software management. For example, it may be determined when each computing device with a particular software application has been on the network. This may be used to determine if a software license is not being used and/or may not be appropriate for a computing device. A machine-idle report may be generated which can be used to remove computing devices from a network after an idle period, saving licensing costs for example. Such a report may be prepared using information from the HR profiler 150 to determine if the primary user of the computing device is on extended leave, for instance.

The event data may be used to quickly determine if a computing device is online and whether a user is logged on. In an implementation, it may be determined which computing devices are online that do not have current security updates. The current security updates may be distributed immediately to the computing devices that are online that do not have the current security updates. Any type of software may be distributed in such a manner, e.g., pursuant to determining using the event data that the computing device is online and there is no user logged on. Additionally, historical logon patterns may be determined using the event data and may be evaluated to determine times when service may be performed on the computing device without impacting a user of the computing device.

Although not shown in FIG. 1, the institution system 105 may include a user interface module which may generate and format one or more pages of content as a unified graphical presentation that may be provided to the computing device of a user. In an implementation, the page(s) of content may be provided to the computing device of the user via a secure website associated with the institution system 105.

The institution system 105 may include any combination of systems and subsystems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like.

The institution system 105 may comprise one or more computing devices 106. The computing device(s) 106 may have one or more processors 107, storage 108 (e.g., storage devices, memory, etc.), and software modules 109. The computing device(s) 106, including its processor(s) 107, storage 108, and software modules 109, may be used in the performance of the techniques and operations described herein. An example computing device and its components are described in more detail with respect to FIG. 5.

Examples of software modules 109 may include modules that may be used in conjunction with receiving and storing event data from a user, obtaining data from a data source, generating one or more reports using event data and/or data obtained from one or more data sources, issuing a report to a user such as an administrator, and taking action with respect to the reports, for example. While specific functionality is described herein as occurring with respect to specific modules, the functionality may likewise be performed by more, fewer, or other modules.

Figure 2:
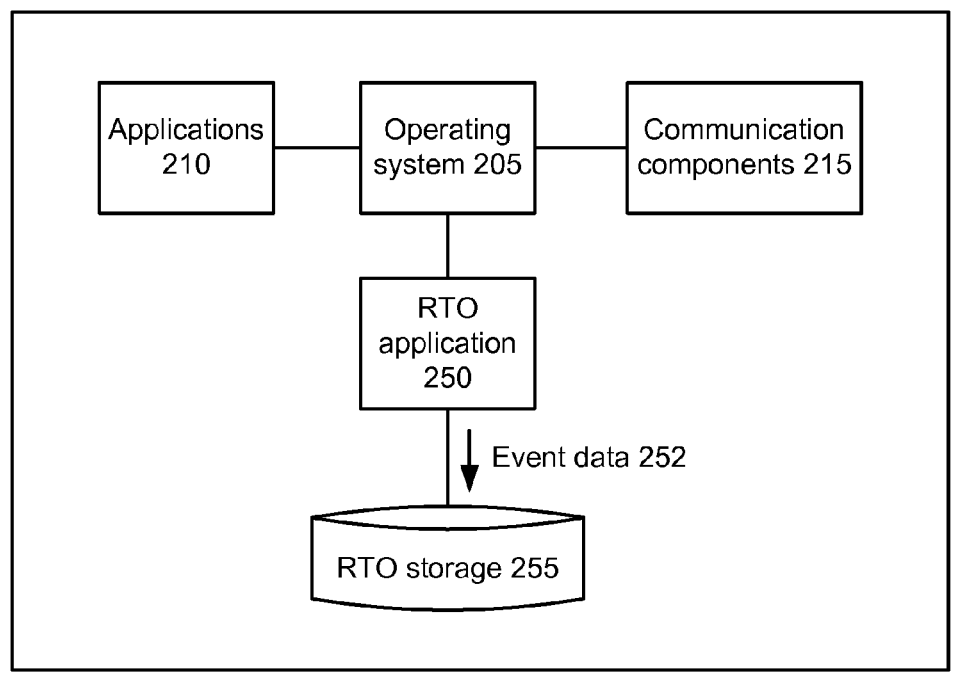
FIG. 2 is a block diagram illustrating example software components executing on a workstation according to an implementation.

Each computing device 182, 187, 192 may run additional software applications in addition to the RTO application 184, 189, 194, some examples of which are described with respect to FIG. 2. FIG. 2 is a block diagram illustrating example software components executing on a computing device 200. In an implementation, the computing device 200 may be similar to one of the computing devices 182, 187, 192 described with respect to FIG. 1.

The computing device 200 may comprise an operating system 205, applications 210, communication components 215, an RTO application 250, and RTO storage 255. The operating system 205 is responsible for performing basic tasks, such as recognizing input from an input device, sending output to an output device, keeping track of files and directories in storage and controlling peripheral devices such as scanners and printers. The operating system 205 is also responsible for managing the execution of other programs, including without limitation, the applications 210, the communication components 215, and the RTO application 250. Any operating system may be used, such as a Windows operating system provided by Microsoft Corporation, for example, or any other known operating system. The operating system 205 may also maintain information relating to system security, memory usage, currently executing processes, network communications, CPU (central processing unit) usage, and the like.

Any one or more applications 210 may operate on the computing device 200, such as a web browser, a word processor, a spreadsheet program, a database program, etc. Communications components 215 may include any known applications that provide or facilitate communications over computer networks and the Internet, for example.

The RTO application 250 operates on the computing device 200 and may comprise scripts directed to startup, shutdown, logon, and logoff events. The scripts may fire at their associated event and collect event data 252, such as data directed to an identifier of the computing device 200, applications operating thereon, an identifier of the user using the computing device 200, a date and time of the event, the type of event, and the like. The type of event may be a user logon, a user logoff, a startup, or a shutdown, in an implementation. The event data may also comprise information directed to the processes executing on the computing device 200 and the computing device 200 resources, such as CPU usage, memory usage, and page file usage.

The event data 252 may be stored in an RTO storage 255 of the computing device 200. The RTO storage 255 may be any type of storage or memory device, and the event data 252 may be stored, e.g., as an entry in a database record corresponding to the computing device 200, the user, the event, the date, and/or the time, etc. The event data 252 may be transmitted to the institution system 105 where it may be received and stored in the RTO repository 122 as described above with respect to FIG. 1.

In an implementation, the scripts directed to startup, shutdown, logon, and logoff events may be embedded into Windows Active Directory. Active Directory is a technology created by Microsoft that provides a variety of network services, including directory services, authentication, naming and other network information. Active Directory allows administrators to assign policies, deploy software, and apply critical updates to an institution or enterprise. Active Directory stores information and settings in a central database. Active Directory networks can vary from a small installation with a few hundred objects, to a large installation with millions of objects.

Event data pertaining to one or more events occurring individually on one or more computing devices may be provided form the computing device(s) to the institution system for storage, analysis, and use in generating one or more reports. The events may all be of the same type (e.g., all directed to user logon, all directed to user logoff, all directed to startup of the computing device(s), all directed to shutdown of the computing device(s)) or may be of different types.

Figure 3:
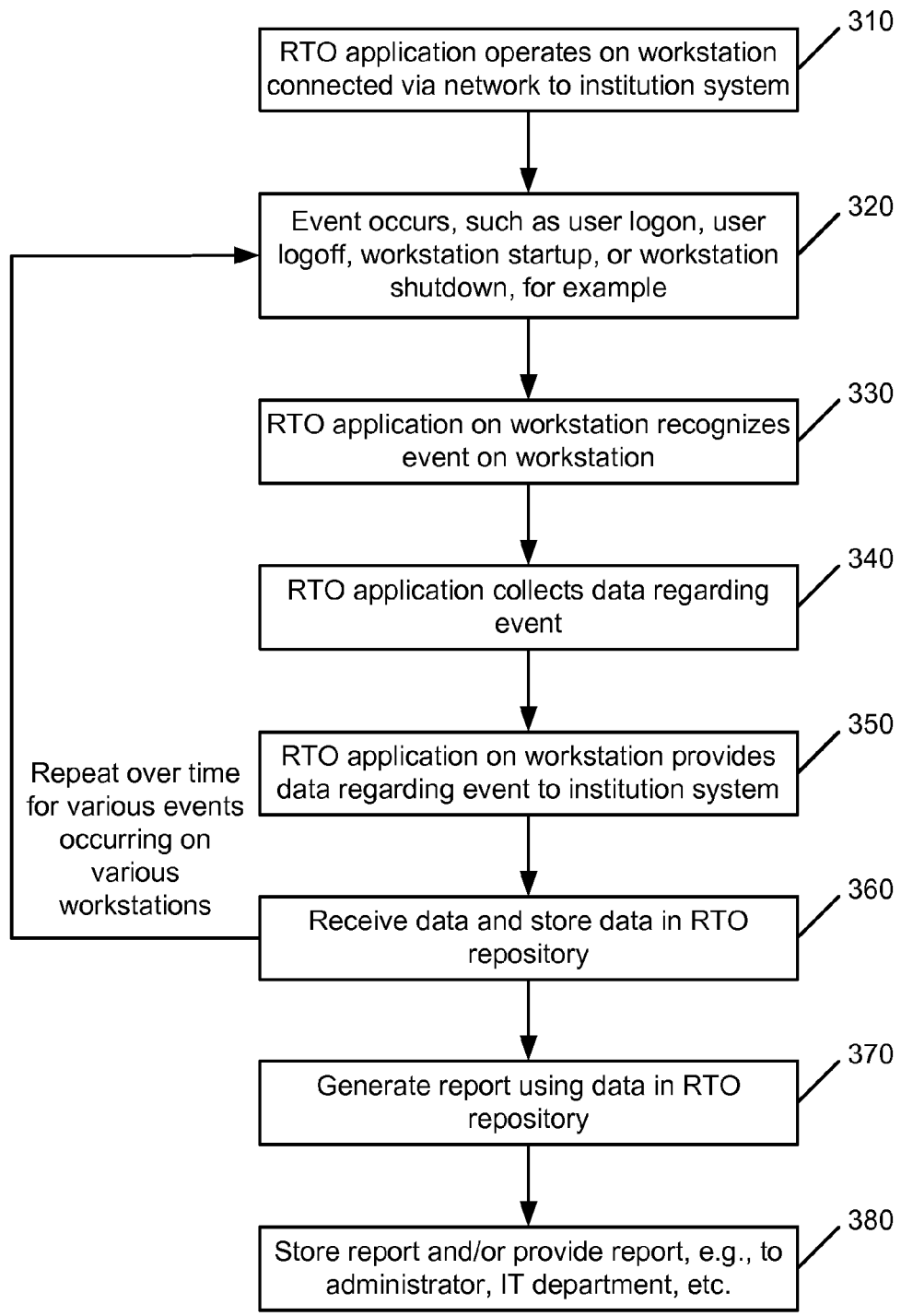
FIG. 3 is an operational flow of an implementation of a method that may be used to provide real-time online monitoring and reporting of computing devices in a network.

FIG. 3 is an operational flow of an implementation of a method 300 that may be used to provide real-time online monitoring and reporting of computing devices in a network. At 310, an RTO application, such as the RTO application 250, is operating on a workstation that is connected via a network to the institution system 105. Each of a plurality of workstations may be operating a respective RTO application. An example of a workstation may be one of the computing devices 182, 187, 192, 200.

At 320, an event occurs. As described above, in an implementation, the event may comprise a startup, shutdown, user logon, or user logoff of the workstation. At 330, the RTO application 250 recognizes the event, and at 340, the RTO application 250 may collect data, such as event data 252, regarding the event.

In an implementation, the event data 252 may be stored in storage at the workstation, such as in RTO storage 255. At 350, the RTO application 250 may provide the event data 252 regarding the event to the institution system 105. The workstation may access the institution system 105 using a communication pathway via a communications network. There may be several ways in which the communication pathway may be established, including, but not limited to, an Internet connection or any other network connection, as described further above.

At 360, the institution system 105 receives the event data 252 and stores the event data 252 in an RTO repository, such as the RTO repository 122. Operations 320 through 360 may repeat over time for various events occurring on various workstations.

At 370, a report may be generated using the event data 252 in the RTO repository 122. The report may be generated upon request by a user (e.g., an administrator of the institution system) or automatically (e.g., at predetermined times (e.g., every day at 3:00 p.m., etc.), pursuant to predetermined events or rules (e.g., whenever the number of online users meets a threshold, whenever a predetermined number of computing devices have not been started up, etc.), using predetermined information from the RTO repository 122, etc.). The report may be stored in storage and/or provided to an administrator or an information technology (IT) department, for example, at 380.

Figure 4:
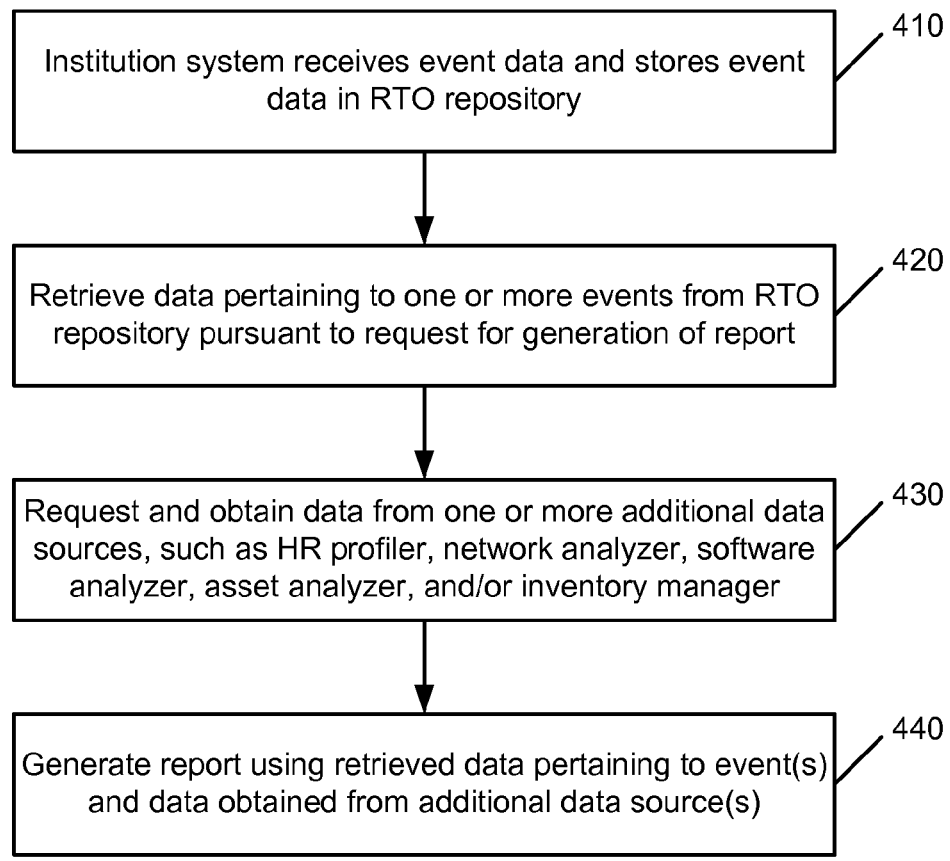
FIG. 4 is an operational flow of another implementation of a method that may be used to provide real-time online monitoring and reporting of computing devices in a network.

FIG. 4 is an operational flow of another implementation of a method 400 that may be used to provide real-time online monitoring and reporting of computing devices in a network. At 410, the institution system 105 receives event data, such as the event data 252 and stores the event data 252 in an RTO repository, such as the RTO repository 122. The data may be stored, e.g., as an entry in a database record corresponding to the workstation or other computing device that triggered the event, the user, if any, associated with the event, the event itself, the date and/or the time of the event, etc.

At 420, data pertaining to one or more events may be retrieved from the RTO repository 122. The data may be retrieved pursuant to a request for a generation of a report, for example.

At 430, data from one or more additional data sources, such as the HR profiler 150, the network analyzer 152, the software analyzer 154, the asset analyzer 156, and the inventory manager 158, may be requested and obtained. The appropriate data may be requested and obtained depending on the report that is to be generated. At 440, a report may be generated using the retrieved data pertaining to the event(s) and the data that has been obtained from the one or more additional data sources.

Figure 5:
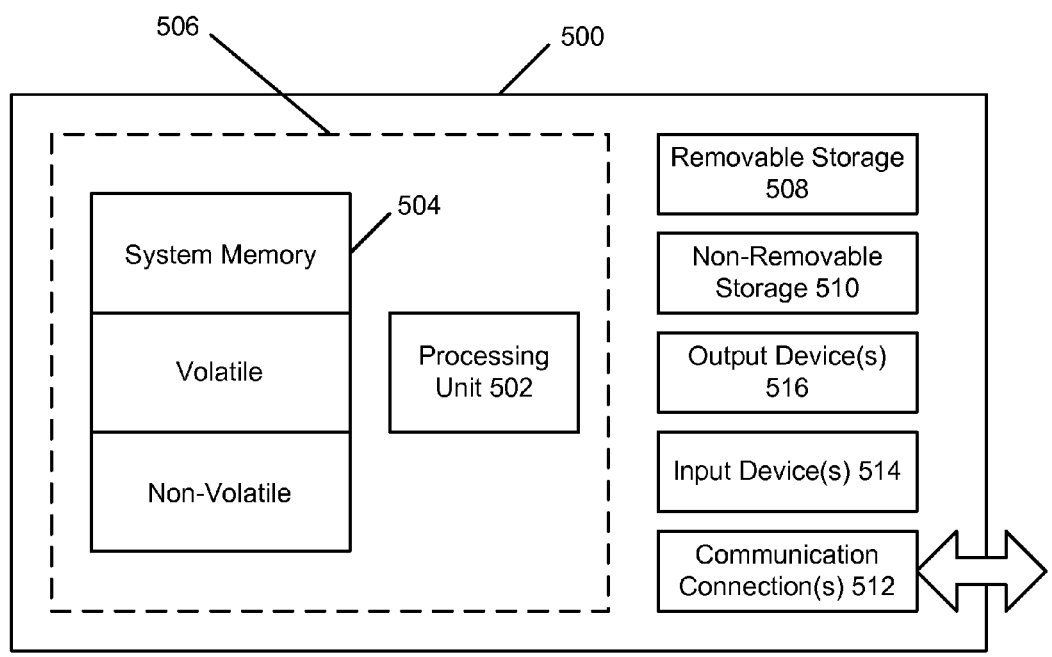
FIG. 5 is a block diagram of an example computing environment in which example embodiments and aspects may be implemented.

FIG. 5 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and system memory 504. Depending on the exact configuration and type of computing device, system memory 504 may be volatile (such as RAM), non-volatile (such as read-only memory (ROM), flash memory, etc.), or some combination of the two. This most basic configuration is illustrated in FIG. 5 by dashed line 506.

Computing device 500 may have additional features and/or functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer-readable media. Computer-readable media can be any available media that can be accessed by computing device 500 and includes both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 504, removable storage 508, and non-removable storage 510 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of computing device 500.

Computing device 500 may also contain communication connection(s) 512 that allow the computing device 500 to communicate with other devices. Communication connection(s) 512 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

Computing device 500 may be one of a plurality of computing devices 500 inter-connected by a network. As may be appreciated, the network may be any appropriate network, each computing device 500 may be connected thereto by way of communication connection(s) 512 in any appropriate manner, and each computing device 500 may communicate with one or more of the other computing devices 500 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer-readable medium comprising computer-readable instructions for monitoring a computing device, said computer-readable instructions comprising instructions that:
   recognize an occurrence of an event on the computing device, the computing device being connected via a network to an institution system, the event being one of a user logon, a user logoff, a startup of the computing device, or a shutdown of the computing device;
   provide event data upon recognizing the occurrence of the event in real-time from the computing device to the institution system via the network;
   provide user information data from the computing device to the institution system via the network;
   receive the event data and the user information at the institution system;
   store the event data and the user information in a repository of the institution system;
   conduct a determination of an asset utilization for the computing device utilizing the event data and the user information; and
   conduct a determination of software licensing management for the computing device utilizing the event data and the user information.

2. The computer-readable medium of claim 1, further comprising instructions that execute a software application on the computing device that recognizes the occurrence of the event.

3. The computer-readable medium of claim 2, further comprising instructions that collect the event data using the software application prior to providing the event data to the institution system.

4. The computer-readable medium of claim 1, wherein the event data comprises data pertaining to at least one of the computing device, a user of the computing device, or the event.

5. The computer-readable medium of claim 1, further comprising instructions that retrieve the event data from the repository and generate a report using the event data.

6. The computer-readable medium of claim 5, wherein the report is generated in conjunction with information from at least one of a human resources profiler, a network analyzer, a software analyzer, an asset analyzer, or an inventory manager.

7. The computer-readable medium of claim 1, further comprising instructions that:
   recognize a plurality of further occurrences of the event on the computing device;
   in real-time upon recognizing each of the plurality of occurrences of the event, provide additional event data regarding the event from the computing device to the institution system via the network;
   receive the additional event data at the institution system;
   store the additional event data in the repository;
   retrieve the event data and the additional event data from the repository; and
   generate a report using the event data and the additional event data.

8. A non-transitory computer-readable medium comprising computer-readable instructions for monitoring a plurality of computing devices, each of the plurality of computing devices being connected via a network to an institution system, said computer-readable instructions comprising instructions that:

recognize an occurrence of a first event on a first computing device of the plurality of computing devices, the first event being one of a user logon to the first computing device, a user logoff from the first computing device, a startup of the first computing device, or a shutdown of the first computing device;

in real-time upon recognizing the occurrence of the first event, provide event data regarding the first event from the first computing device to the institution system via the network;

recognize an occurrence of a second event on a second computing device of the plurality of computing devices, the second event being one of a user logon to the second computing device, a user logoff from the second computing device, a startup of the second computing device, or a shutdown of the second computing device;

provide event data upon recognizing the occurrence of the second event from the second computing device to the institution system via the network;

provide user information data from the first and the second computing device to the institution system via the network, receive and store, the first event data, the second event data, and the user information data at the institution system;

conduct a determination of an asset utilization for the first and the second computing device utilizing the first event data, the second event data, and the user information; and conduct a determination of software licensing management for the first and second computing device utilizing the first event data and the second event data.

9. The computer-readable medium of claim 8, wherein both the first event and the second event are of a type of event, the type being one of a user logon, a user logoff, a startup, or a shutdown, and both the first event and the second event are of a same type of event.

10. The computer-readable medium of claim 8, wherein both the first event and the second event are of a type of event, the type being one of a user logon, a user logoff, a startup, or a shutdown, and the first event and the second event are of a different type of event.

11. The computer-readable medium of claim 8, further comprising instructions that generate a report using the first event data and the second event data.

12. The computer-readable medium of claim 11, wherein the report is directed to at least one of a plurality of online computing devices, a plurality of offline computing devices, or a plurality of logged on users.

13. The computer-readable medium of claim 8, further comprising instructions that:

recognize an occurrence of a third event on the first computing device, the third event being one of an additional user logon to the first computing device, an additional user logoff from the first computing device, an additional startup of the first computing device, or an additional shutdown of the first computing device;

in real-time upon recognizing the occurrence of the third event, provide additional event data regarding the third event from the first computing device to the institution system via the network;

receive the additional event data at the institution system;

store the additional event data at the institution system; and generate a report using the first event data, the second event data, and the additional event data.

14. The computer-readable medium of claim 8, further comprising instructions that:

recognize a plurality of occurrences of a plurality of events on the plurality of computing devices, each of the plurality of events being one of a user logon to one of the computing devices, a user logoff from one of the computing devices, a startup of one of the computing devices, or a shutdown of one of the computing devices;

in real-time upon recognizing each of the plurality of occurrences of the events, provide additional event data regarding the event from the associate computing device to the institution system via the network;

receive the additional event data at the institution system; and store the additional event data in a repository of the institution system.

15. A system for monitoring a plurality of computing devices, comprising:

at least one subsystem that receives a plurality of event data from the plurality of computing devices, each of the plurality of event data directed to one of a plurality of events that has occurred on one of the plurality of computing devices, each of the plurality of events being one of a user logon, a user logoff, a startup of the computing device, or a shutdown of the computing device, the plurality of event data being received in real-time upon an occurrence of each of the plurality of events;

at least one subsystem that stores the plurality of event data and corresponding user information for the plurality of computing devices in a repository;

at least one subsystem that generates a report using the plurality of event data and corresponding user information;

at least one subsystem that conducts a determination of an asset utilization for the plurality of computing devices utilizing the plurality of event data and the corresponding user information; and at least one subsystem that conducts a determination of software licensing management for the plurality of computing devices utilizing the plurality of event data.

16. The system of claim 15, further comprising at least one subsystem that executes a software application on each of the plurality of computing devices, each software application executing on one of the plurality of computing devices to recognize the occurrence of events of the computing device on which the software application is executed.

17. The system of claim 16, wherein each software application collects event data of a recognized event of the computing device on which the software application is executed, the computing device providing the collected event data to an institution system for storage in the repository.

18. The system of claim 15, wherein each event data of the plurality of event data comprises data pertaining to at least one of the computing devices on which the event pertaining to the event data occurred, the user of the computing device on which the event pertaining to the event data occurred, or the event.

19. The system of claim 15, further comprising at least one subsystem that receives information from at least one of a human resources profiler, a network analyzer, a software analyzer, an asset analyzer, or an inventory manager, wherein the report is generated using the information.

20. The system of claim 15, wherein each of the plurality of events is of a type of event, the type being one of a user logon, a user logoff, a startup, or a shutdown, and all of the plurality of events are of a same type of event.

21. The system of claim 15, further comprising:

at least one subsystem that receives a plurality of additional event data from the plurality of computing devices, each of the plurality of additional event data directed to an additional one of the plurality of events that has occurred on any of the plurality of computing devices, the plurality of additional event data being received in real-time upon an occurrence of each of the additional plurality of events; and at least one subsystem that stores the plurality of additional event data in the repository.

\* \* \* \* \*